United States Patent
Creasman

(10) Patent No.: US 10,054,958 B2
(45) Date of Patent: Aug. 21, 2018

(54) VERTICAL TAKEOFF AND LANDING (VTOL) UNMANNED AERIAL VEHICLE (UAV)

(71) Applicant: Son F. Creasman, San Marcos, CA (US)

(72) Inventor: Son F. Creasman, San Marcos, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 467 days.

(21) Appl. No.: 14/695,693

(22) Filed: Apr. 24, 2015

(65) Prior Publication Data

US 2016/0378120 A1    Dec. 29, 2016

Related U.S. Application Data

(60) Provisional application No. 61/990,416, filed on May 8, 2014.

(51) Int. Cl.
*G05D 1/10* (2006.01)
*B64C 29/02* (2006.01)
(Continued)

(52) U.S. Cl.
CPC .......... *G05D 1/102* (2013.01); *B64C 3/546* (2013.01); *B64C 3/56* (2013.01); *B64C 9/00* (2013.01);
(Continued)

(58) Field of Classification Search
CPC .. B64C 3/40; B64C 3/546; B64C 3/56; B64C 9/00; B64C 11/48; B64C 25/04;
(Continued)

(56) References Cited

U.S. PATENT DOCUMENTS

| | | | |
|---|---|---|---|
| 5,114,096 A | 5/1992 | Wernicke | |
| 5,289,994 A | 3/1994 | Del Campo Aguilera | |
| 5,765,783 A | 6/1998 | Albion | |
| 6,193,187 B1* | 2/2001 | Scott | B64G 1/14 244/159.3 |
| 8,434,710 B2 | 5/2013 | Hothi et al. | |
| 9,567,088 B2 | 2/2017 | Godlasky et al. | |
| 2002/0074452 A1* | 6/2002 | Ingram | B64C 3/40 244/7 B |
| 2006/0011777 A1 | 1/2006 | Arlton et al. | |
| 2007/0034739 A1 | 2/2007 | Yoeli | |
| 2008/0272226 A1* | 11/2008 | Colclough | B64C 3/54 244/2 |

(Continued)

FOREIGN PATENT DOCUMENTS

| | | |
|---|---|---|
| EP | 1982914 A2 | 10/2008 |
| EP | 1988014 A2 | 11/2008 |

(Continued)

OTHER PUBLICATIONS

International Search Report for corresponding PCT/US2015/027565, dated Jan. 21, 2016.

*Primary Examiner* — Thomas G Black
*Assistant Examiner* — Ce Li Li
(74) *Attorney, Agent, or Firm* — Tarolli, Sundheim, Covell & Tummino LLP

(57) ABSTRACT

One example embodiment includes a vertical takeoff and landing (VTOL) unmanned aerial vehicle (UAV). The VTOL UAV includes a flight control system configured to provide avionic control of the VTOL UAV in a hover mode and in a level-flight mode. The VTOL UAV also includes a body encapsulating an engine and the flight control system. The VTOL UAV further includes a propeller disk coupled to the engine and configured to provide vertical thrust in the hover mode and to provide horizontal thrust for flight during the level-flight mode.

18 Claims, 6 Drawing Sheets

(51) Int. Cl.
*B64C 3/56* (2006.01)
*B64C 9/00* (2006.01)
*B64C 39/02* (2006.01)
*B64C 11/48* (2006.01)
*B64F 1/00* (2006.01)
*B64C 3/54* (2006.01)
*B64C 25/04* (2006.01)
*G05D 1/00* (2006.01)

(52) U.S. Cl.
CPC .............. *B64C 11/48* (2013.01); *B64C 25/04* (2013.01); *B64C 29/02* (2013.01); *B64C 39/024* (2013.01); *B64F 1/007* (2013.01); *G05D 1/0011* (2013.01); *B64C 2201/028* (2013.01); *B64C 2201/102* (2013.01); *B64C 2201/108* (2013.01)

(58) Field of Classification Search
CPC . B64C 29/02; B64C 39/024; B64C 2201/028; B64C 2201/102; B64C 2201/108; G05D 1/0011; G05D 1/102; B64F 1/007
See application file for complete search history.

(56) References Cited

U.S. PATENT DOCUMENTS

| | | | |
|---|---|---|---|
| 2010/0256839 A1* | 10/2010 | Fitzpatrick | B64C 39/024 701/8 |
| 2011/0046817 A1* | 2/2011 | Hamke | G05D 1/101 701/3 |
| 2011/0052392 A1* | 3/2011 | Khmel | B64C 11/306 416/1 |
| 2012/0292436 A1 | 11/2012 | Karem | |
| 2015/0102157 A1 | 4/2015 | Godlasky et al. | |
| 2015/0284075 A1 | 10/2015 | Alber | |

FOREIGN PATENT DOCUMENTS

| | | |
|---|---|---|
| FR | 2871136 A1 | 12/2005 |
| WO | 9426589 A | 11/1994 |
| WO | 2177966 A2 | 4/2010 |

\* cited by examiner

VERTICAL TAKEOFF AND LANDING (VTOL) UNMANNED AERIAL VEHICLE (UAV)

RELATED APPLICATIONS

The present invention claims priority from U.S. Provisional Patent Application No. 61/990,416, entitled "VERTICAL TAKEOFF AND LANDING (VTOL) UNMANNED AERIAL VEHICLE (UAV)", filed May 8, 2014, and which is incorporated herein by reference in its entirety.

TECHNICAL FIELD

The present invention relates generally to aviation, and specifically to a vertical takeoff and landing (VTOL) unmanned aerial vehicle (UAV).

BACKGROUND

For many decades, aircraft have been implemented for a variety of uses as means of transportation, reconnaissance, and warfare. Different types of aircraft have been historically implemented for different purposes. Traditional airplanes implement wings for aerodynamic lift and can typically fly faster and in an aerodynamically efficient manner. However, vertical takeoff and landing (VTOL) aircraft are typically used for operations where speed is not necessarily required. Additionally, VTOL aircraft allow for more space efficient takeoff and landing procedures by not requiring a runway that allows the aircraft to accelerate during takeoff and decelerate during landing. As some flight operations became increasingly more dangerous or tedious, unmanned aerial vehicles (UAV) have been developed as a means for replacing pilots in the aircraft for controlling the aircraft.

SUMMARY

One example embodiment includes a vertical takeoff and landing (VTOL) unmanned aerial vehicle (UAV). The VTOL UAV includes a flight control system configured to provide avionic control of the VTOL UAV in a hover mode and in a level-flight mode. The VTOL UAV also includes a body encapsulating an engine and the flight control system. The VTOL UAV further includes a propeller disk coupled to the engine and configured to provide vertical thrust in the hover mode and to provide horizontal thrust for flight during the level-flight mode.

Another example embodiment includes a method for controlling a VTOL UAV. The method includes activating an engine to rotate a propeller disk to provide vertical thrust in a hover mode of the VTOL UAV corresponding to a substantially vertical orientation of the VTOL UAV. The method also includes extending a plurality of wings from a body of the VTOL UAV at a first predetermined altitude in the hover mode. The method also includes changing an orientation of the VTOL UAV from the substantially vertical orientation to a substantially horizontal orientation at a second predetermined altitude that is greater than the first predetermined altitude via at least one of engine speed and control flaps that are coupled to the body and respectively offset equally and oppositely with respect to a central axis of the body substantially entirely within a propeller wash of the propeller disk that is defined by a diameter of the propeller disk. The method further includes controlling the engine to rotate the propeller disk to provide horizontal thrust in a level-flight mode of the VTOL UAV corresponding to the substantially vertical orientation of the VTOL UAV.

Another example embodiment includes a VTOL UAV. The VTOL UAV a flight control system configured to provide avionic control of the VTOL UAV in a hover mode for takeoff and landing procedures of the VTOL UAV and in a level-flight mode for a mission procedure of the VTOL UAV. The VTOL UAV also includes a body encapsulating an engine and the flight control system and comprising a plurality of retractable wings being configured in a flying-wing configuration, the plurality of retractable wings being in a retracted state in the hover mode and in an extended state in the level-flight mode to provide aerodynamic lift in the level-flight mode. The VTOL UAV further includes a propeller disk comprising a pair of contra-rotating propellers coupled to the engine and being axially-fixed along a central axis of the body, the pair of contra-rotating propellers being configured to provide vertical thrust in the hover mode and to provide horizontal thrust for flight during the level-flight mode.

DETAILED DESCRIPTION

The present invention relates generally to aviation, and specifically to a vertical takeoff and landing (VTOL) unmanned aerial vehicle (UAV). The VTOL UAV can include a propeller disk configured to provide thrust and a flight control system configured to provide avionic control of the VTOL UAV in a hover mode and in a level-flight mode. The hover mode can correspond to a substantially vertical orientation of the VTOL UAV with respect to a central axis of the VTOL UAV, and the level-flight mode can correspond to a substantially horizontal orientation of the VTOL UAV. Therefore, as an example, the VTOL UAV can perform takeoff and landing procedures in the hover mode, and can perform mission operations in the level-flight mode. As an example, the propeller disk can be configured as a pair of contra-rotating propellers to provide vertical thrust with substantially zero torque in the hover mode, and the propeller can provide horizontal thrust in the level-flight mode while wings coupled to the body of the VTOL UAV can provide aerodynamic lift.

Figure 1:
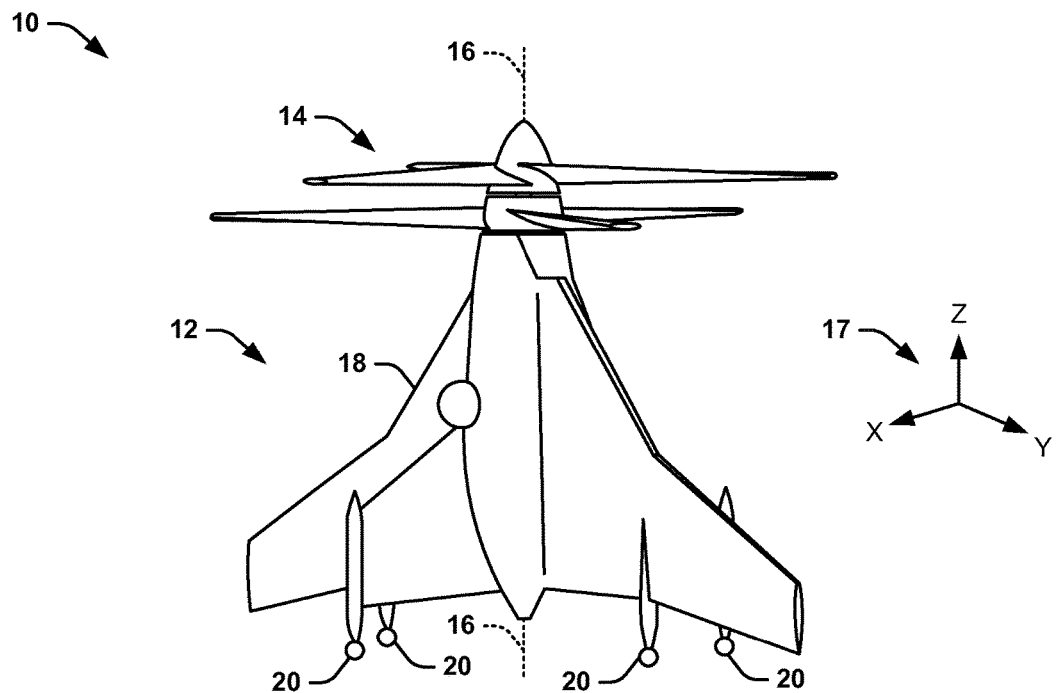
FIG. 1 illustrates an example of a first isometric view of a VTOL UAV.
Figure 2:
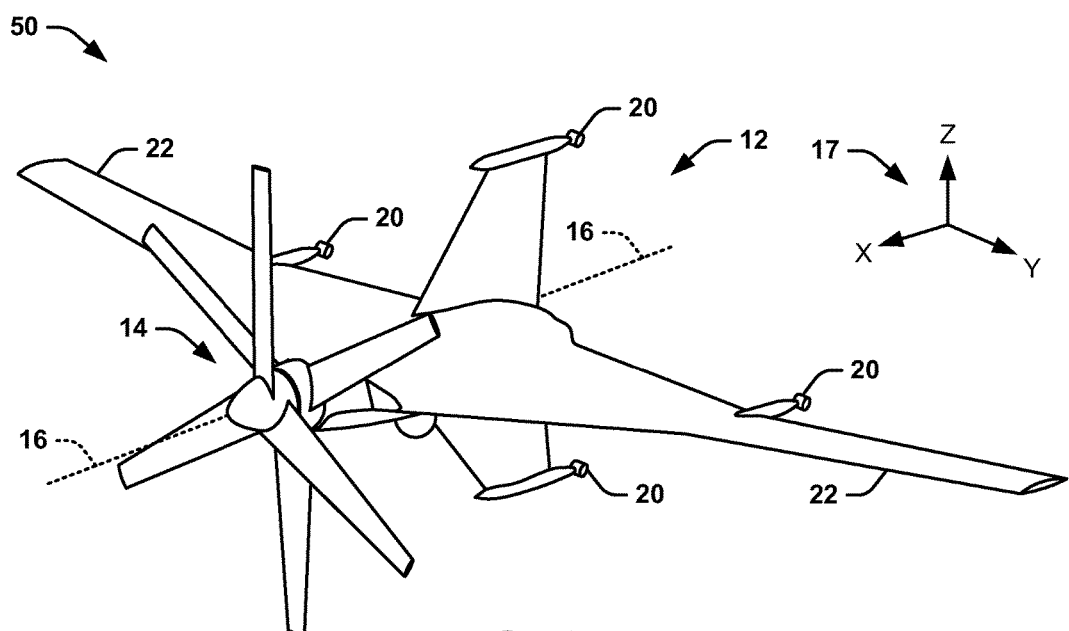
FIG. 2 illustrates an example of a second isometric view of the VTOL UAV.

FIG. 1 illustrates an example of a first isometric plan view 10 of a VTOL UAV 12, and FIG. 2 illustrates an example of a second isometric plan view 50 of the VTOL UAV 12. The VTOL UAV 12 is demonstrated in the example of FIG. 1 in a hover mode, such that the VTOL UAV 12 is provided in a substantially vertical orientation, and the VTOL UAV 12 is demonstrated in the example of FIG. 2 in a level-flight mode, such that the VTOL UAV 12 is provided in a substantially horizontal orientation. The VTOL UAV 12 includes a propeller disk 14 at a fore-section of the VTOL UAV 12 that is substantially aligned with a central axis 16 of the VTOL UAV 12. The central axis 16 can extend through an approximate center of the VTOL UAV 12, such that the VTOL UAV 12 can be approximately symmetrical about the central axis 16 in two orthogonal planes, as dictated by the Cartesian coordinate system 17 (e.g., the XZ-plane and YZ-plane in the example of FIG. 1 and the XY-plane and XZ-plane in the example of FIG. 2). As described herein, a "propeller disk" is defined as a propeller portion that includes rotating propeller blades that are configured to provide circular motion to rapidly move atmospheric air to provide thrust. The propeller disk 14 is configured to provide vertical thrust (e.g., along the Z-axis in the example of FIG. 1) in the hover mode and to provide horizontal thrust (e.g., along the X-axis in the example of FIG. 2) in the level-flight mode. Therefore, as described herein, the substantially vertical orientation and the substantially horizontal orientation of the VTOL UAV 12 are defined with respect to the orientation of the central axis 16 relative to the surface of the Earth.

The VTOL UAV 12 can include a body 18 that encloses a variety of internal components of the VTOL UAV 12, including a flight control system, an engine to control the propeller disk 14, fuel, and/or a variety of input/output (I/O) devices (e.g., sensors, actuators, etc.). As an example, the flight control system encapsulated in the body 18 can include one or more sensors configured to determine the orientation of the VTOL UAV 12 (e.g., gyroscope(s), magnetometer(s), artificial horizon, etc.). The propeller disk 14 is demonstrated as being coupled to the body 18 in a fixed arrangement, such that the propeller disk 14 is substantially constantly aligned with the central axis 16. In the examples of FIGS. 1 and 2, the propeller disk 14 is demonstrated as a pair of contra-rotating propellers. Therefore, the propeller disk 14 provides approximately zero torque about the central axis 16 based on the contra-rotation of the portions of the propeller disk 14. Additionally, the contra-rotating propellers of the propeller disk 14 can provide for a much more simplified design for providing lift than multiple separate-axis propellers that have to be constantly adjusted to provide substantially equal lift in all atmospheric conditions (e.g., in the presence of wind or varying air-pressure profiles). While the propeller disk 14 is demonstrated as including three blades on each of the pair of contra-rotating propellers, it is to be understood that the propeller disk 14 can include any number of blades on each of the contra-rotating propellers. The VTOL UAV 12 also includes landing posts 20 that are fixed to the body 18 in an aft-section of the VTOL UAV 12 opposite the propeller disk 14 in the fore-section. Therefore, the VTOL UAV 12 can be configured to land on the landing posts 20 in a "tail-sitting" arrangement in the hover mode.

As an example, the body 18 can be configured as a flying-wing arrangement, and thus has no definitive fuselage and tail. The flying-wing arrangement of the body 18 includes a pair of wings 22 that can be, for example, retractable (e.g., folding). In the example of FIG. 2, the wings 22 are demonstrated as extended in the level-flight mode, and in the example of FIG. 1, the wings 22 are demonstrated as retracted (e.g., folded) in the hover mode, and are thus omitted in the first isometric view 10. The wings 22 can be extended and retracted in the hover mode (e.g., at predetermined altitudes), such as prior to and subsequent to the level-flight mode, respectively. For example, the wings 22 can be retracted during the hover mode (e.g., throughout most of the takeoff and landing procedures) to substantially mitigate the effects of wind acting on the position of the VTOL UAV 12, and can be extended in the level-flight mode to provide aerodynamic lift of the VTOL UAV 12 for more efficient aerodynamic flight and greater speeds. Therefore, the flight control system encapsulated in the body 18 can be configured to provide avionic control of the VTOL UAV in each of the hover mode and the level-flight mode.

Figure 3:
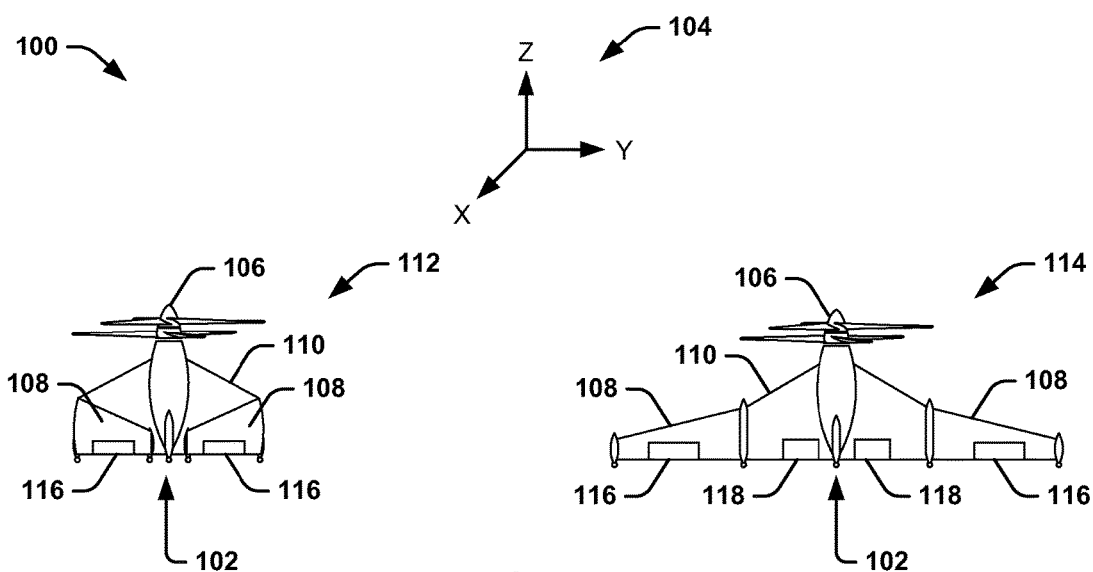
FIG. 3 illustrates an example diagram of a VTOL UAV in a first view.
Figure 4:
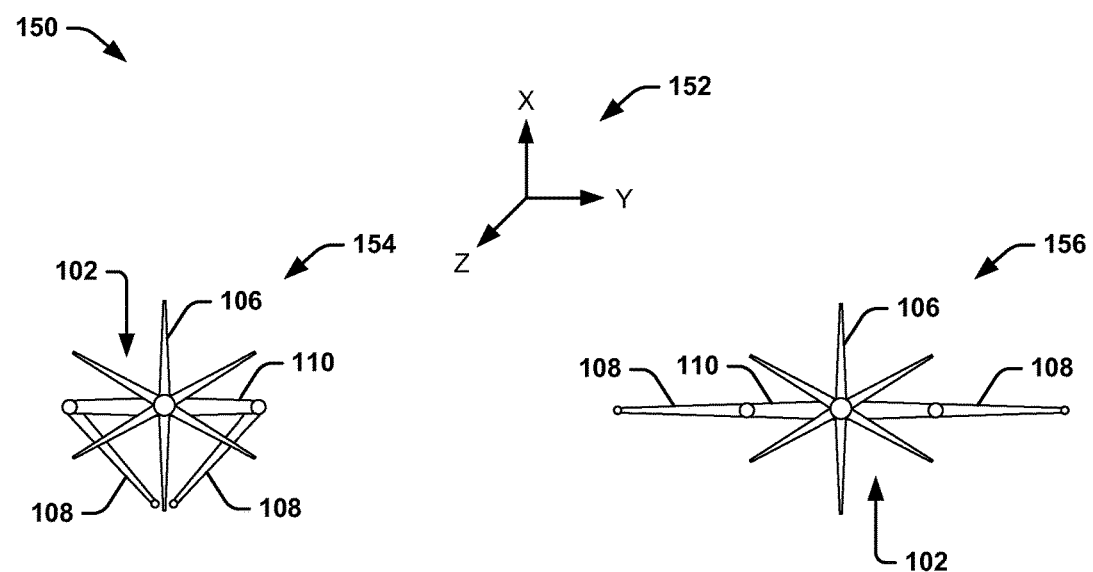
FIG. 4 illustrates an example diagram of a VTOL UAV in a second view.

FIG. 3 illustrates an example diagram 100 of a VTOL UAV 102 in a first view. FIG. 4 illustrates an example diagram of the VTOL UAV 150 in a second view. The VTOL UAV 102 can correspond to the VTOL UAV 12 in the examples of FIGS. 1 and 2. The first view of the VTOL UAV 102 is a two-dimensional view in a YZ-plane, as dictated by the Cartesian coordinate system 104. Similarly, the second view of the VTOL UAV 102 is a two-dimensional view in an XY-plane, as dictated by the Cartesian coordinate system 152. In the examples of FIGS. 3 and 4, like reference numbers are used to describe the physical portions of the VTOL UAV 102.

Similar to as described previously, the VTOL UAV 102 includes a propeller disk 106 that is arranged as a pair of contra-rotating propellers. In addition, the VTOL UAV 102 includes a pair of folding wings 108 that are coupled to a fixed body portion 110 in a collapsible flying-wing configuration. In the first view 100 in the example of FIG. 3, the VTOL UAV 102 is demonstrated at 112 in a folded-wings configuration and at 114 in an extended-wings configuration. Similarly, in the second view 150 in the example of FIG. 4, the VTOL UAV 102 is demonstrated at 154 in a folded-wings configuration and at 156 in an extended-wings configuration. As described previously, the folded-wings configuration 112 and 154 can be implemented in the hover mode, such as during at least a portion of a takeoff procedure and/or a landing procedure, and the extended-wings configuration can be implemented in the level-flight mode, such as during completion of mission objectives.

In the example of FIG. 3, the VTOL UAV 102 includes a first pair of control flaps 116 coupled to the folding wings 108 and a second pair of control flaps 118 coupled to the fixed body portion 110. The first pair of control flaps 116 can be configured to provide avionic direction control in the level-flight mode (e.g., when the folding wings 108 are extended). The second pair of control flaps 118 can be located approximately equal and opposite a central axis (e.g., the central axis 16) on the fixed body portion 110, such as substantially entirely within a propeller wash of the VTOL UAV 102. As described herein, the term "propeller wash" is defined as the region corresponding approximately to a diameter of the propeller disk 106 along which the thrust is provided based on the rotation (e.g., contra-rotation) of the propeller disk 106. Therefore, the second pair of control flaps 118 can be implemented to provide avionic control authority for the VTOL UAV 102 during the hover mode. For example, tilting both of the second pair of control flaps 118 to one side of the fixed body portion 110 can provide a lateral directional movement of the VTOL UAV 102 in the direction to which the respective side of the fixed body portion 110 faces during the hover mode. As another example, tilting the second pair of control flaps 118 to opposite sides of the fixed body portion 110 can provide rotation of the VTOL UAV 102, such as in a stationary position in three-dimensional space, during the hover mode. Therefore, the second pair of control flaps 118 can be implemented to provide accurate positioning of the VTOL UAV 102 in three-dimensional space in the hover mode, such as during takeoff and landing procedures. Additionally, the second pair of control flaps 118 can cooperate with the first pair of control flaps 116 to provide avionic direction control of the VTOL UAV 102 in the level-flight mode.

In the examples of FIGS. 3 and 4, the folding wings 108 are demonstrated as being folded toward a first side of the fixed body portion 110 in the folded-wings configuration 112 and 154. As described previously, the folding wings 108 can be provided in the folded-wings configuration 112 and 154 during the hover mode to substantially mitigate the effects of wind acting upon the VTOL UAV 102, such as during takeoff and landing procedures. Additionally, the first side of the fixed body portion 110 toward which the folding wings 108 are retracted (e.g., folded) can correspond to a top surface of the VTOL UAV 102 in the level-flight mode. Therefore, the folded-wings configuration 112 and 154 can be provided to accommodate placement of a payload on the second side of the fixed body portion 110 that is opposite the first side of the fixed body portion 110. In other words, the side of the fixed body portion 110 opposite the location of the folding wings 108 in the folded-wings configuration 112 and 154 can correspond to a bottom surface of the VTOL UAV 102 in the level-flight mode, and can thus be fitted with a payload (e.g., communications equipment, optical equipment, and/or ordnance). Accordingly, by retracting the folding wings 108 to one side of the fixed body portion 110 (e.g., corresponding to the top surface in the level-flight mode), the folding wings 108 do not spatially interfere with the placement of the payload on the opposite surface of the fixed body portion 110.

Figure 5:
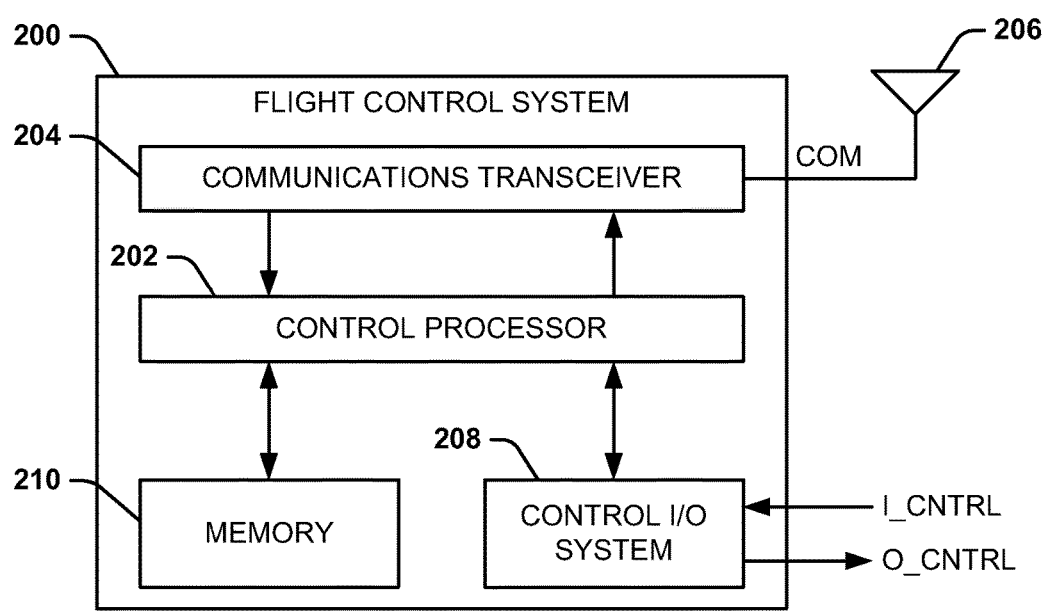
FIG. 5 illustrates an example of a flight control system.

FIG. 5 illustrates an example of a flight control system 200. The flight control system 200 can be encapsulated within the body 18 of the VTOL UAV 12 (e.g., within the fixed body portion 110 of the VTOL 102). Thus, the flight control system 200 can be configured to provide avionic control of the VTOL UAV 12 in both the hover mode and the level-flight mode. Thus, reference is to be made to the example of FIGS. 1-4 in the following description of the example of FIG. 5.

The flight control system 200 includes a processor 202 and a communications transceiver 204 that is configured to transmit and receive communications signals COM via an antenna 206. As an example, the communications signals COM can be provided to and from one or more external control stations, such as a stationary control center, a ship, a satellite, and/or another aircraft. For example, the communications signals COM can include signals transmitted from the VTOL UAV 12 that can correspond to video, location, status updates, and/or a variety of other signals to be communicated to the external control station. As another example, the communications signals COM can include signals received by the VTOL UAV 12, such as global positioning satellite (GPS) signals, command signals, status signals, and/or mission objective signals. For example, the VTOL UAV 12 can be configured as a remotely controlled drone, such that at least a portion of the communications signals COM received by the VTOL UAV 102 can correspond to flight control signals to remotely pilot the VTOL UAV 102. The processor 202 can thus be configured to interpret the received communications signals COM and to facilitate creation of and transmission of the transmitted communication signals COM.

The flight control system 200 also includes a control input/output (I/O) system 208 configured to receive input signals I_CNTRL and to transmit output signals O_CNTRL to control input and output components, respectively, associated with the VTOL UAV 12. As an example, the signals O_CNTRL can correspond to output signals to control substantially all of the components of the VTOL UAV 12, such as the engine, the payload, the control flaps 116 and 118, and any of a variety of other components (e.g., motors for retraction and extension of the folding wings 108). Additionally, as another example, the signals I_CNTRL can correspond to sensor input signals provided from a variety of sensor systems of the VTOL UAV 12, such as optical sensors, flight sensors, and any of a variety of other sensor components. Additionally, the control I/O system 208 can include one or more sensors configured to determine the orientation of the VTOL UAV 12 (e.g., gyroscope(s), magnetometer(s), artificial horizon, etc.). The control I/O system 208 is communicatively coupled to the processor 202, such that the processor is configured to interpret the received signals I_CNTRL and to output the signals O_CNTRL for control of the VTOL UAV 12. Accordingly, the processor 202 is configured to implement the mission objectives of the VTOL UAV 12 based on the communications signals COM and the signals I_CNTRL and O_CNTRL.

Additionally, the flight control system 200 includes a memory 210. The memory 210 can be configured to store a variety of data that can be associated with operation of the VTOL UAV 12. As an example, the memory 210 can be configured to store a mission protocol that can correspond to predetermined operations that can be performed by the processor 202 to complete mission objectives. As described previously, the VTOL UAV 12 can be configured as a remotely controlled drone, such that at least a portion of the communications signals COM received by the VTOL UAV 102 can correspond to flight control signals to remotely pilot the VTOL UAV 102. However, as another example, the VTOL UAV 12 can be configured as a robot that is configured to autonomously complete the mission objectives based on the mission protocol stored in the memory 210 and/or based on predetermined control parameters stored in the memory 210, such as can define autonomous control of the VTOL UAV 12. Therefore, the VTOL UAV 12 can be locally or remotely activated (e.g., via a communications signals COM received by the VTOL UAV 102) to autonomously takeoff, perform the mission objectives, and land without any remote piloting. As another example, the VTOL UAV 12 can be configured to include a piloting override and/or to perform aspects of the mission objectives autonomously, while other aspects of the mission objectives are performed via a remote pilot.

Figure 6:
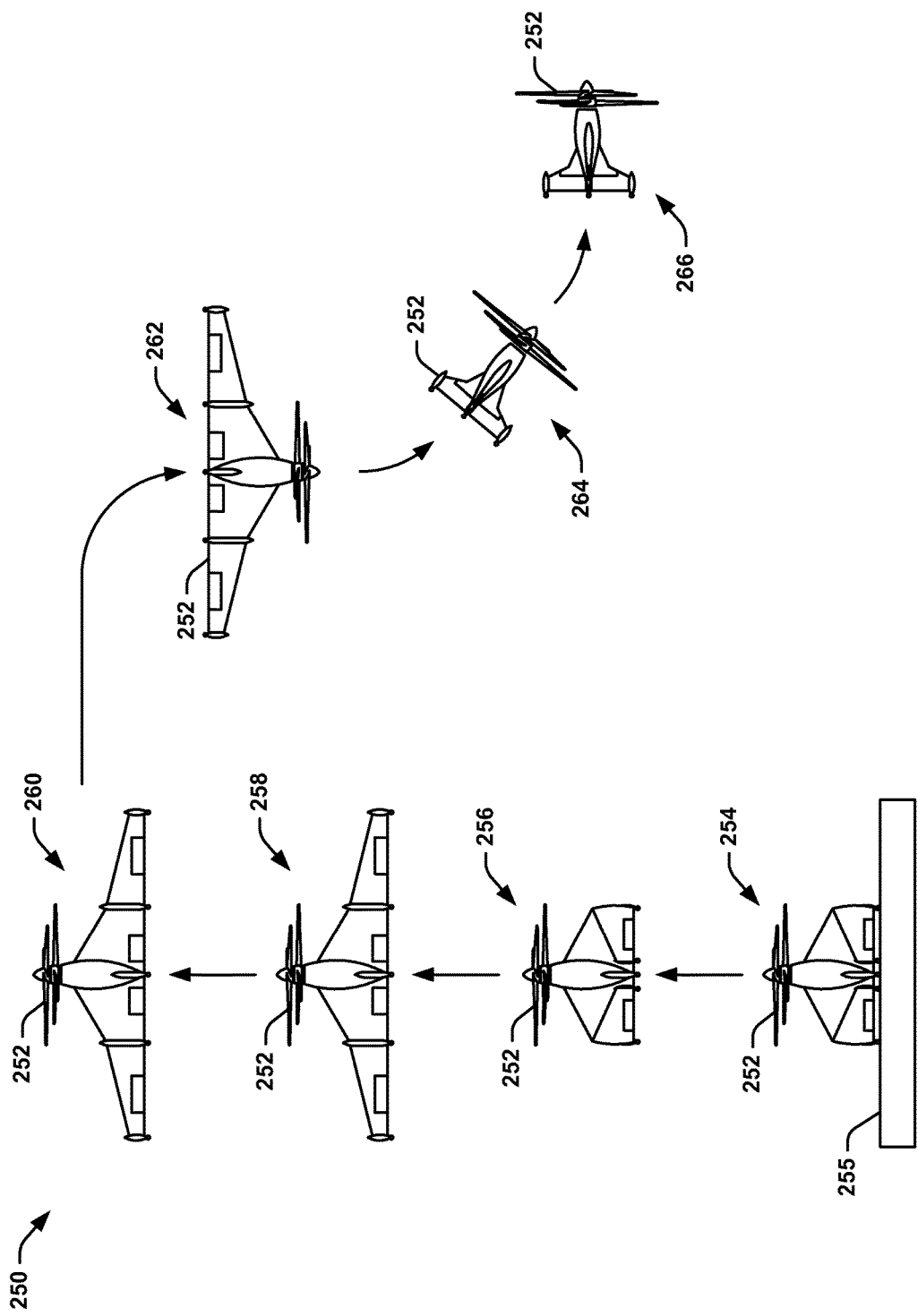
FIG. 6 illustrates an example diagram of a takeoff procedure of a VTOL UAV.

FIG. 6 illustrates an example diagram 250 of a takeoff procedure of a VTOL UAV 252. As an example, the VTOL UAV 252 can correspond to the VTOL UAV 12 and/or 102 in the examples of FIGS. 1 and 2 and FIGS. 3 and 4, respectively. Therefore, reference is to be made to the examples of FIGS. 1-4 in the following description of the example of FIG. 6.

At 254, the VTOL UAV 252 is demonstrated as being at rest on a landing pad 255. As an example, the landing pad 255 can be ground-based, or can be located on a nautical ship, and can include an external control station configured to communicate with the VTOL UAV 252 via the communication signals COM. The VTOL UAV 252 is demonstrated at 254 as being in a folded-wings configuration (e.g., the folded-wings configuration 112 and 154 in the examples of FIGS. 3 and 4), and can initiate the takeoff procedure from the location at 254. At 256, the VTOL UAV 252 is demonstrated in the hover mode, and thus providing thrust in the vertical direction via a propeller (e.g., the propeller disk 14). The propeller can be controlled at a power that is sufficient to create lift, and thus to proceed with the takeoff procedure to increase altitude of the VTOL UAV 252 in the hover mode. The VTOL UAV 252 is demonstrated at 256 as maintaining the folded-wings configuration (e.g., the folded-wings configuration 112 and 154 in the examples of FIGS. 3 and 4), such as to mitigate the effects of wind forces acting upon the VTOL UAV 252.

At 258, the VTOL UAV 252 is demonstrated as maintaining the hover mode, and continues to ascend in altitude via thrust in the vertical direction provided by the propeller (e.g., the propeller disk 14). Upon reaching a first predetermined altitude at 258, the VTOL UAV 252 extends (e.g., unfolds) wings from a fixed body (e.g., the fixed body portion 110) in an extended-wings configuration (e.g., the extended-wings configuration 114 and 156 in the examples of FIGS. 3 and 4). The VTOL UAV 252 maintains the power of the propeller that is sufficient to create lift to continue to increase altitude of the VTOL UAV 252 in the hover mode. At 260, the VTOL UAV 252 achieves a second predetermined altitude corresponding to a transition from the hover mode to the level-flight mode. At 260, the power of the propeller of the VTOL UAV 252 can be decreased and/or control flaps (e.g., the second pair of control flaps 118) can be controlled to pitch the VTOL UAV 252 to one side. Thus, the VTOL UAV 252 can change from a substantially vertical orientation in the hover mode to a substantial horizontal orientation.

At 262, the VTOL UAV 252 is demonstrated as beginning a dive in the level-flight mode. Thus, at 262, the VTOL UAV 252 can increase speed based on the dive, and can begin to increase propeller power again to achieve a power sufficient to maintain flight of the VTOL UAV 252. At 264, the VTOL UAV 252 begins to level off, and thus begins to experience aerodynamic lift via the wings in the level-flight mode. At 266, the VTOL UAV 252 is demonstrated fully in the substantially horizontal orientation in the level-flight mode. Thus, the propeller is providing thrust in the horizontal direction to achieve a substantially rapid flight speed, and the wings provide aerodynamic lift in the level-flight mode to maintain aerial flight of the VTOL UAV 252. Accordingly, at 266, the takeoff procedure is complete, and subsequent to 266, the VTOL UAV 252 can perform mission objectives. While the VTOL UAV 252 is demonstrated as climbing in altitude to the second predetermined altitude at 260 in the hover mode then diving down to achieve level flight in the level-flight mode at 266, it is to be understood that the VTOL UAV 252 can be configured instead to maintain sufficiently high propeller power at 260 and level off to the level-flight mode via the control flaps (e.g., the second pair of control flaps 118) instead of diving to achieve the level-flight mode.

Figure 7:
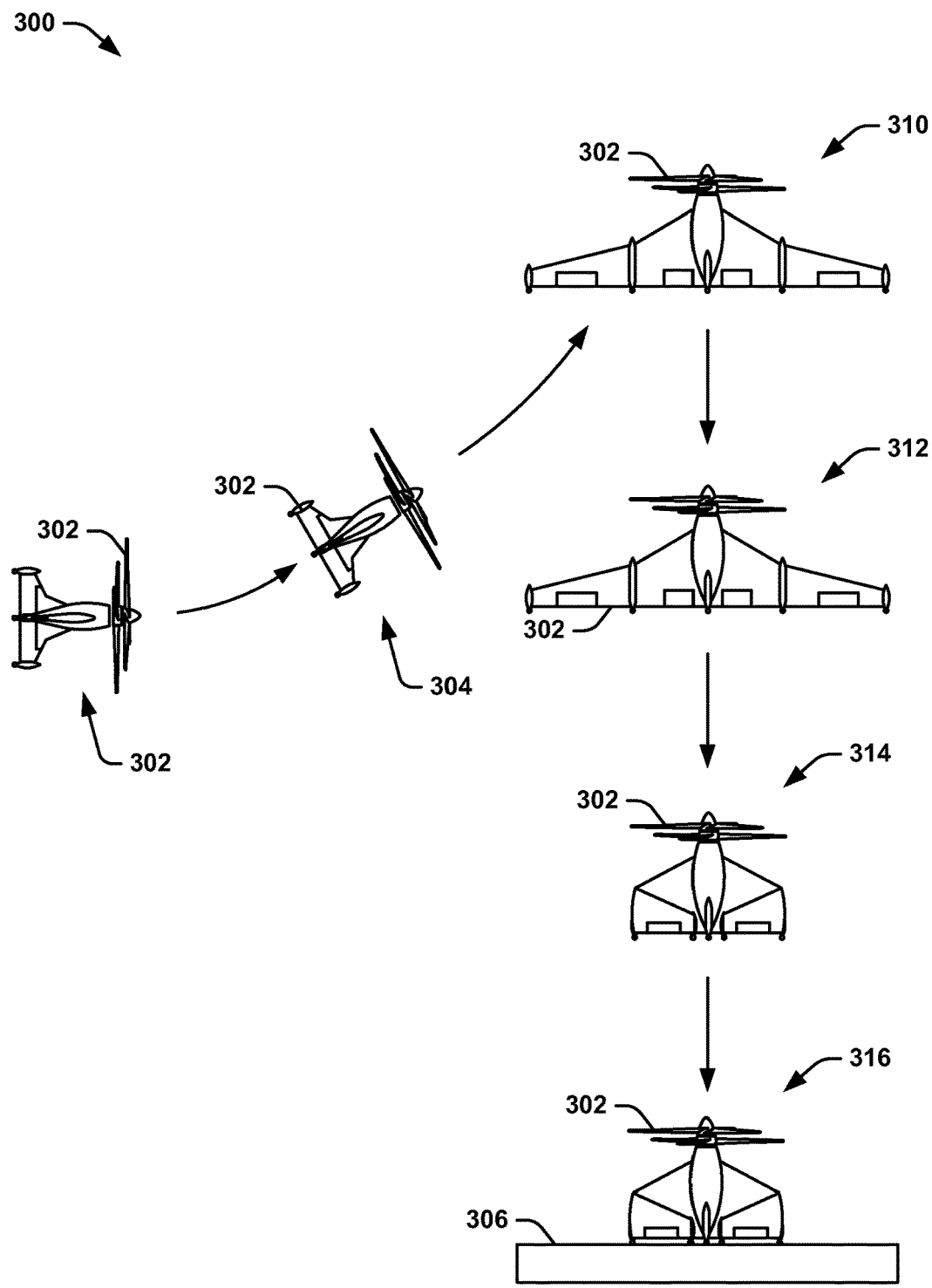
FIG. 7 illustrates an example diagram of a landing procedure of a VTOL UAV.

FIG. 7 illustrates an example diagram 300 of a landing procedure of a VTOL UAV 302. At 304, the VTOL UAV 302 is demonstrated fully in the substantially horizontal orientation in the level-flight mode. Thus, the propeller is providing thrust in the horizontal direction to provide a substantially rapid flight speed while the wings provide aerodynamic lift in the level-flight mode to maintain aerial flight of the VTOL UAV 302. As an example, the VTOL UAV 302 can have just completed mission objectives and is returning to an associated landing pad 306.

At 308, the VTOL UAV 302 begins ascending in the level-flight mode by orienting the nose (e.g., the propeller) in a substantially vertical orientation (e.g., via at least one of the first and second pairs of control flaps 116 and 118). At 310, the VTOL UAV 302 can achieve a substantial maximum altitude in the level-flight mode, and can thus switch to the hover mode. For example, upon achieving a substantially full vertical orientation, the VTOL UAV 302 can reduce the power of the propeller to cease climbing further in altitude, and can thus begin descending in the hover mode. As an example, the VTOL UAV 302 can achieve the maximum altitude in the level-flight mode, and thus the transition to the hover mode, at a location that is approximately above the associated landing pad 306.

At 312, the VTOL UAV 302 can continue descending in altitude in the hover mode based on the substantially reduced propeller power. As an example, at 312, the VTOL UAV 302 can implement the control flaps (e.g., the second pair of control flaps 118) to orient the tips of the wings of the VTOL UAV 302 to be approximately in-line with the path of any wind to substantially mitigate the effects of wind forces acting upon the VTOL UAV 302. At 314, the VTOL UAV 302 is demonstrated as maintaining the hover mode, and continues to descend in altitude via the reduced power of the propeller.

Upon reaching a predetermined altitude at 314, the VTOL UAV 302 retracts (e.g., folds) wings (e.g., to one side) in a folded-wings configuration (e.g., the folded-wings configuration 112 and 154 in the examples of FIGS. 3 and 4). Thus, the folded-wings configuration can continue to substantially mitigate the effects of wind forces acting upon the VTOL UAV 302. Additionally, the VTOL UAV 302 can implement the control flaps (e.g., the second pair of control flaps 118) to provide directional control and lateral movement of the VTOL UAV 302 to move and/or maintain the VTOL UAV 302 substantially directly over the landing pad 306. Therefore, at 316, the VTOL UAV 302 can land on the associated landing pad 316, such as via the landing posts 20. Thus, at 316, the landing procedure is complete.

Figure 8:
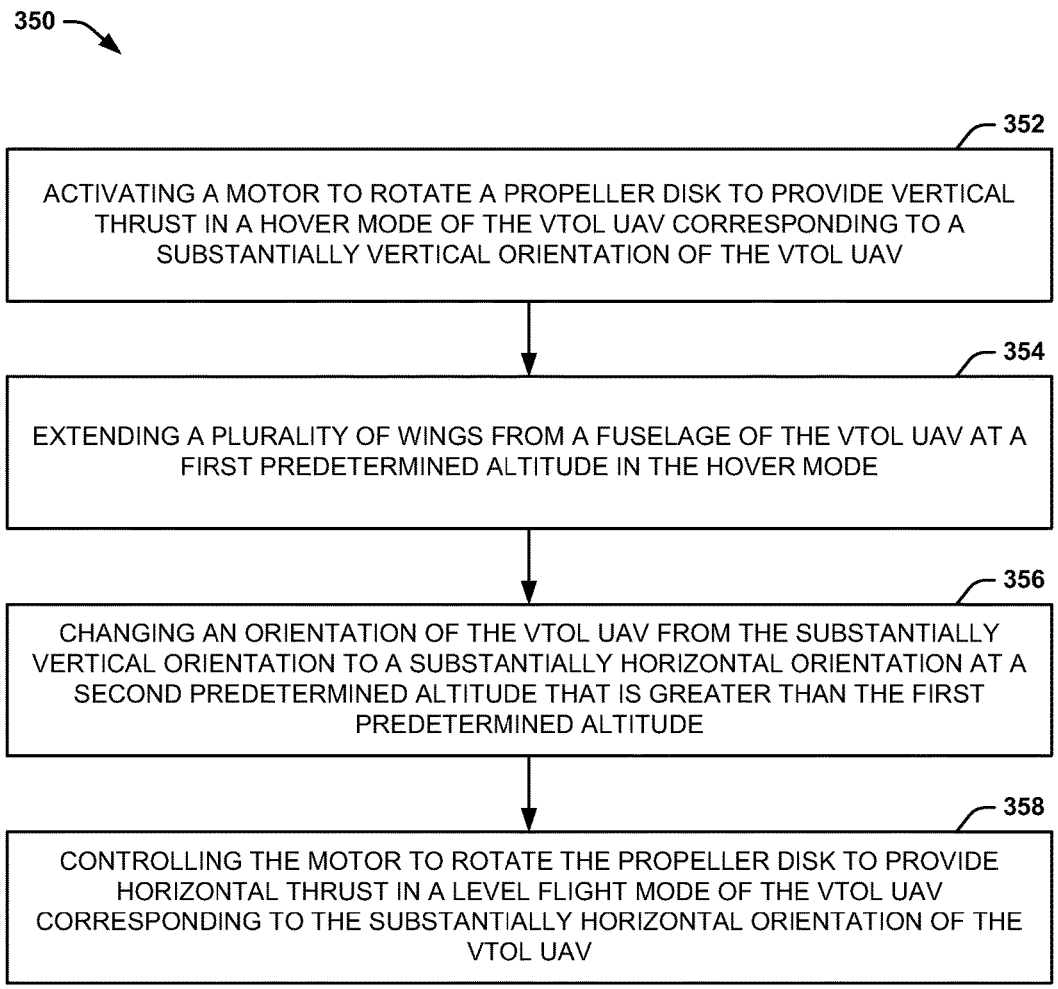
FIG. 8 illustrates an example of a method for controlling a VTOL UAV.

In view of the foregoing structural and functional features described above, a methodology in accordance with various aspects of the present invention will be better appreciated with reference to FIG. 8. While, for purposes of simplicity of explanation, the methodology of FIG. 8 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect of the present invention.

FIG. 8 illustrates an example of a method 350 for controlling a VTOL UAV (e.g., the VTOL UAV 10). At 352, an engine is activated to rotate a propeller (e.g., the propeller disk 14) to provide vertical thrust in a hover mode of the VTOL UAV corresponding to a substantially vertical orientation of the VTOL UAV. At 354, a plurality of wings (e.g., the wings 22) are extended from a body (e.g., the body 18) of the VTOL UAV at a first predetermined altitude in the hover mode (e.g., demonstrated at 258 in the example of FIG. 6). At 356, an orientation of the VTOL UAV is changed from the substantially vertical orientation to a substantially horizontal orientation at a second predetermined altitude that is greater than the first predetermined altitude. The change in orientation can occur based on at least one of engine speed and control flaps (e.g., the second pair of control flaps 118) that are coupled to the body and respectively offset equally and oppositely with respect to a central axis (e.g., the central axis 16) of the body substantially entirely within a propeller wash of the propeller (e.g., demonstrated at 260 in the example of FIG. 6). At 358, the engine is controlled to rotate the propeller to provide horizontal thrust in a level-flight mode of the VTOL UAV corresponding to the substantially horizontal orientation of the VTOL UAV.

What have been described above are examples of the invention. It is, of course, not possible to describe every conceivable combination of components or method for purposes of describing the invention, but one of ordinary skill in the art will recognize that many further combinations and permutations of the invention are possible. Accordingly, the invention is intended to embrace all such alterations, modifications, and variations that fall within the scope of this application, including the appended claims.

What is claimed is:

1. A vertical takeoff and landing (VTOL) unmanned aerial vehicle (UAV) comprising:
    a flight control system configured to provide avionic control of the VTOL UAV in a hover mode and in a level-flight mode, wherein the flight control system is configured to takeoff and land the VTOL UAV in the hover mode and to implement mission objectives in the level-flight mode;
    a body encapsulating an engine and the flight control system, the body being configured as a collapsible flying-wing and comprising landing posts on an aft-section of the body;
    a propeller disk located on a fore-section of the body and coupled to the engine and configured to provide vertical thrust in the hover mode and to provide horizontal thrust for flight during the level-flight mode; and
    a plurality of retractable wings, coupled to the body of the VTOL UAV, each configured to fold toward a side of the body, the plurality of retractable wings being in a retracted state in at least a portion of the hover mode and in an extended state in the level-flight mode to provide aerodynamic lift in the level-flight mode.

2. The vehicle of claim 1, wherein the propeller disk comprises a pair of contra-rotating propellers axially-fixed along a central axis of the body.

3. The vehicle of claim 1, further comprising a first control flap and a second control flap that are each coupled to the body and are respectively offset equally and oppositely with respect to a central axis of the body and substantially entirely within a propeller wash of the propeller disk that is defined by a diameter of the propeller disk, the first and second control flaps being controlled by the flight control system to provide rotation and lateral motion control of the VTOL UAV during the hover mode.

4. The vehicle of claim 1, wherein the side is a first side, the plurality of retractable wings are each configured to fold toward the first side of the body to accommodate placement of a payload on a second side of the body that is opposite the first side of the body.

5. The vehicle of claim 1, wherein the plurality of retractable wings each comprise a control flap configured to provide avionic directional control in the level-flight mode.

6. The vehicle of claim 1, wherein the flight control system comprises:
    a communications transceiver configured to transmit and receive communications signals via an antenna;
    a control input/output (I/O) system configured to transmit and receive I/O signals to control input and output components associated with the VTOL UAV; and
    a processor configured to implement mission objectives based on the communications signals and the I/O signals.

7. The vehicle of claim 6, further comprising a memory configured to store at least one of a mission protocol and autonomous control parameters, such that the VTOL UAV is activated to takeoff, perform the mission objectives, and land, respectively, in an autonomous manner based on the at least one of the stored mission protocol and the autonomous control parameters.

8. The vehicle of claim 6, wherein the communications signals comprise flight control signals that are transmitted from an external control station and are received by the communication transceiver, such that the VTOL UAV is configured to takeoff, perform the mission objectives, and land, respectively, based on the received flight control signals.

9. A method for controlling a vertical takeoff and landing (VTOL) unmanned aerial vehicle (UAV), the method comprising:
    activating an engine to rotate a propeller disk located on a fore-section of a body of the VTOL UAV to provide vertical thrust in a hover mode of the VTOL UAV corresponding to a substantially vertical orientation of the VTOL UAV to takeoff and land the VTOL UAV in the hover mode;
    changing an orientation of the VTOL UAV from the substantially vertical orientation to a substantially horizontal orientation at a second predetermined altitude that is greater than the first predetermined altitude via at least one of engine speed and control flaps that are coupled to the body and respectively offset equally and oppositely with respect to a central axis of the body of the VTOL UAV substantially entirely within a propeller wash of the propeller disk that is defined by a diameter of the propeller disk to implement mission objectives in a level-flight mode, wherein the body is configured as a collapsible flying-wing and comprises landing posts on an aft-section of the body;
    controlling the engine to rotate the propeller disk to provide horizontal thrust in a level-flight mode of the VTOL UAV corresponding to the substantially horizontal orientation of the VTOL UAV; and
    folding each of a plurality of retractable wings, coupled to the body, toward a side of the body, the plurality of retractable wings being in a retracted state in at least a portion of the hover mode and in an extended state in the level-flight mode to provide aerodynamic lift in the level-flight mode.

10. The method of claim 9, wherein the propeller disk comprises a pair of contra-rotating propellers axially-fixed to a fore-section of and along a central axis of the body.

11. The method of claim 9, wherein the side is a first side, wherein extending the plurality of retractable wings comprises unfolding the plurality of retractable wings from the first side of the body to accommodate placement of a payload on a second side of the body that is opposite the first side of the body.

12. The method of claim 9, further comprising accessing at least one of mission protocol and autonomous control parameters from a memory, such that the VTOL UAV is activated to perform the takeoff procedure, to perform mission objectives, and to land, respectively, in an autonomous manner based on the accessed at least one of the mission protocol and the autonomous control parameters.

13. The method of claim 9, further comprising receiving flight control signals via a communications transceiver, the flight control signals being transmitted from an external control station, such that the VTOL UAV is configured to perform the takeoff procedure, to perform mission objectives, and to land, respectively, based on the received flight control signals.

14. The method of claim 9, further comprising:
changing an orientation of the VTOL UAV from the substantially horizontal orientation to the substantially vertical orientation;
decreasing the engine speed to switch from the level-flight mode to the hover mode with a decreasing altitude;
retracting the plurality of wings to the body at the first predetermined altitude in the hover mode; and
landing the VTOL UAV on a landing pad via landing posts on an aft-section of the body opposite the propeller disk.

15. The method of claim 9, further comprising controlling the control flaps to provide at least one of rotation about a central axis of the body of the VTOL UAV and lateral motion of the body of the unmanned VTOL in a direction that is orthogonal with respect to the central axis.

16. A vertical takeoff and landing (VTOL) unmanned aerial vehicle (UAV) comprising:
a flight control system configured to provide avionic control of the VTOL UAV in a hover mode for takeoff and landing procedures of the VTOL UAV and in a level-flight mode for a mission procedure of the VTOL UAV;
a body encapsulating an engine and the flight control system and comprising a plurality of retractable wings being configured in a flying-wing configuration, the plurality of retractable wings each folding toward a side of a body of the VTOL UAV and being in a retracted state in at least a portion of the hover mode and in an extended state in the level-flight mode to provide aerodynamic lift in the level-flight mode; and
a propeller disk comprising a pair of contra-rotating propellers coupled to the engine and being axially-fixed along a central axis of the body, the pair of contra-rotating propellers being configured to provide vertical thrust in the hover mode and to provide horizontal thrust for flight during the level-flight mode.

17. The vehicle of claim 16, further comprising a first control flap and a second control flap that are each coupled to the body and are respectively offset equally and oppositely with respect to a central axis of the body and substantially entirely within a propeller wash of the propeller disk that is defined by a diameter of the propeller disk, the first and second control flaps being controlled by the flight control system to provide rotation and lateral motion control of the VTOL UAV during the hover mode.

18. The vehicle of claim 16, wherein the body comprises landing posts on an aft-section of the body.

\* \* \* \* \*